United States Patent [19]
Ziegler

[11] 3,802,311
[45] Apr. 9, 1974

[54] ANCHOR BOLT
[75] Inventor: George Roland Ziegler, Schaumburg, Ill.
[73] Assignee: Illinois Tool Works Inc., Chicago, Ill.
[22] Filed: Apr. 3, 1972
[21] Appl. No.: 240,631

[52] U.S. Cl. .................................................. 85/79
[51] Int. Cl. .......................................... F16b 13/04
[58] Field of Search ..................... 85/79, 72, 77, 88

[56] References Cited
UNITED STATES PATENTS
| | | | |
|---|---|---|---|
| 3,107,569 | 10/1963 | Lerick | 85/79 |
| 3,427,919 | 2/1969 | Lenich | 85/72 |
| 1,993,749 | 3/1935 | Pleisten | 85/79 |
| 2,362,969 | 11/1944 | Boelter | 85/79 |
| 2,774,273 | 12/1956 | Olson | 85/79 |

FOREIGN PATENTS OR APPLICATIONS
| | | | |
|---|---|---|---|
| 1,033,614 | 7/1958 | Germany | 85/79 |

*Primary Examiner*—Edward C. Allen
*Attorney, Agent, or Firm*—Robert W. Beart; Thomas W. Buckman

[57] ABSTRACT

An anchor bolt assembly having a shank carrying a wedge member within an inclined longitudinal recess. The wedge member is temporarily secured against longitudinal movement and adapted to be frangibly disassociated from the shank to allow the wedge to be displaced outwardly into anchoring engagement within a hole.

4 Claims, 7 Drawing Figures

PATENTED APR 9 1974　　　　　　　　　　　　　　　3,802,311
Fig.1　　　　Fig.2
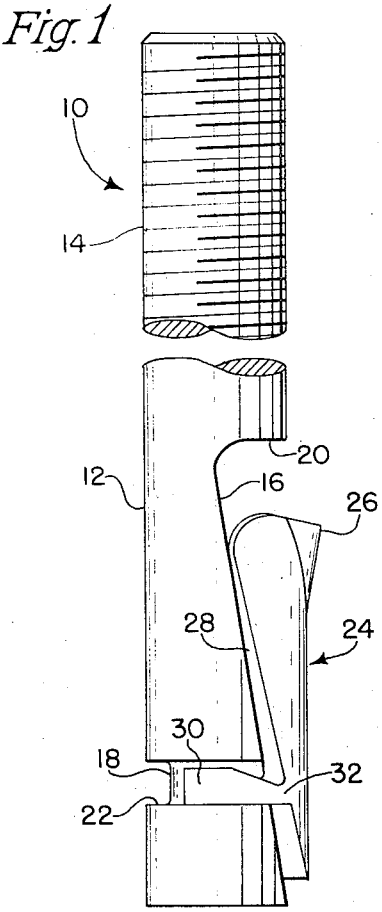
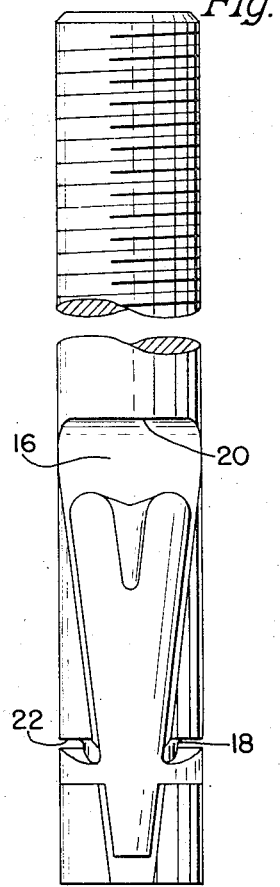
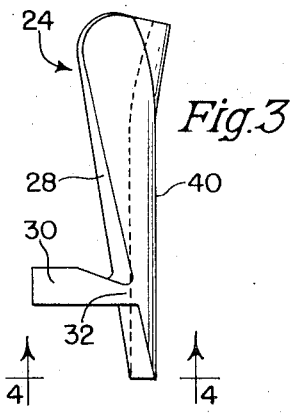
Fig.3
Fig.5
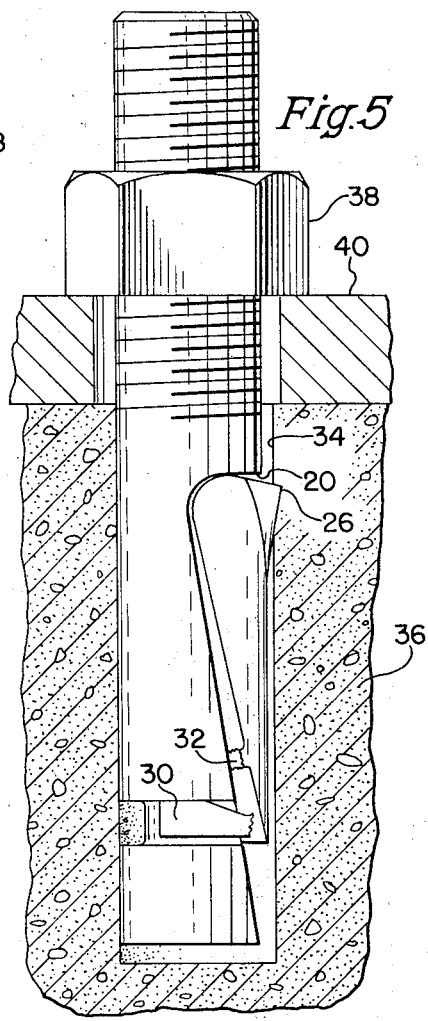
Fig.6
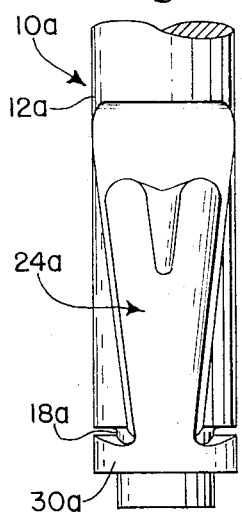
Fig.4
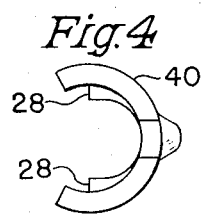
Fig.7
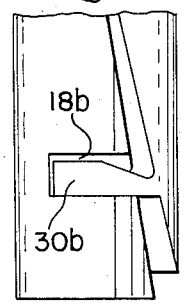

ANCHOR BOLT

BACKGROUND OF THE INVENTION

This invention relates to a novel wedge-type expansion bolt which is adapted to be firmly anchored within a blind hole.

Anchor bolts have been devised which utilize wedge members located in grooves or recesses on a bolt shank. These grooves may include an inclined bearing surface against which a wedge member or members are received so that when the bolt or shank is moved in a direction of withdrawal from a hole, the wedges are forced outwardly into engagement with the surface of the associated hole, thus tending to preclude complete withdrawal of the shank. Important aspects to be considered in the selection of such an expansion bolt include the ease of preassembly and shipment of such wedge actuated bolts and, of course, the pull-out strength of such an anchoring structure.

Examples of prior art efforts in wedge-type expansion bolts are concerned with providing a cylindrical type wedge member which completely encircles a portion of the shank of reduced diameter. One example utilizes a strip of flexible tape to hold a pair of wedge members together in a preassembled fashion on the shank. A four piece bolt is thus provided which presents numerous problems in assembly. In addition, the tape may break in such a manner as to expand the wedges unevenly. Another example utilizes a bolt having parabola-like bearing surface which is relatively expensive to manufacture. In addition, the wedge members of this patent provide a point contact extending about the periphery of this parabola-like surface. Such a point contact does not result in satisfactory pull-out strength.

Other efforts to provide wedge anchors have utilized a number of intricate interacting elements which are extremely expensive to manufacture and preassemble.

Thus, the deficiencies of the prior art generally reside in the inability to provide a relatively inexpensive anchor which may be handled in a preassembled form, and which includes the capability to be subjected to relatively large forces tending to pull the bolt from an associated hole.

SUMMARY OF THE INVENTION

It is an object of this invention to provide an anchor bolt having greatly increased holding power.

It is another object of the invention to provide an anchor bolt assembly which includes a shank portion and a wedge member adapted to be readily preassembled and retained in this preassembled configuration during shipment and yet be adapted to readily wedge one another against the walls of an associated hole.

A further object of the invention is to provide an anchor bolt assembly which maximizes the peripheral wedging surface contact area, thus substantially increasing the pull-out strength of the assembly.

Yet another object of this invention is the provision of a wedge member for an anchor bolt which may readily be constructed from a thin, stamped material and hardened to give it a spring-like quality and to further provide such a wedge with an upset portion to facilitate entry into a hole which may be slightly greater than the nominal hole size.

The above, and other objects and advantages of the present invention, are incorporated in a bolt assembly which includes an inclined recess at one extremity thereof and which is adapted to receive a wedge member having a generally arcuate outer surface. The shank further includes a second recess extending at least partially about the periphery shank and adapted to receive frangible arms extending from the edges of the wedge.

With the above construction, an anchor bolt is provided which includes a maximum surface contact area between the anchor and the walls of the associated hole. The frangibility of the arms, as they are normally situated in a peripheral groove, allows the wedge to become completely free of attachment to the shank when a suitable insertion force is applied to the shank in placing it in a hole.

BRIEF DESCRIPTION OF THE DRAWINGS

FIG. 1 is a side elevation view of the assembled anchor bolt.

FIG. 2 is a front elevational view of the anchor bolt shown in FIG. 1.

FIG. 3 is a side elevation view of the wedge member of the anchor bolt assembly.

FIG. 4 is an end view of the wedge member shown in FIG. 3.

FIG. 5 is a side elevation view of the anchor bolt assembly after it is inserted in an associated hole.

FIG. 6 is a front elevation view of a modified form of the anchor bolt.

FIG. 7 is a side elevation view of yet another modified form of the anchor bolt assembly.

DESCRIPTION OF THE PREFERRED EMBODIMENTS

Referring in more detail to the drawings, FIG. 1 shows that the anchor bolt assembly 10 includes an elongated cylindrical shank 12 which may include a threaded portion 14 at one end thereof and an expansion portion at the other end.

The expansion portion of this assembly includes a recess 16 which is an inclined bearing surface extending upwardly and inwardly from a point at or near the end of the shank. The recess is formed with an undercut shoulder portion 20 at the upper extremity of the recess.

A second recess or indention on the shank is formed near the end of the bolt 10 which includes the expansion portion. This second recess 18 extends at least partially about the circumference of the shank and intersects the inclined bearing surface 16. A tapered wedge member 24 is designed and dimensioned to be complementary with the longitudinal recess 16 and surface of the shank. The wedge member, which is more particularly described in FIGS. 3 and 4, is characterized by having a generally arcuate outer surface 40 and longitudinal edges 28, which are adapted to operatively cooperate with the inclined surface 16. The wedge 24 may advantageously and economically be produced from a relatively thin stamping which is formed to complement the generally cylindrical periphery of the bolt in the area of the recess 16.

The arms preferably extend for more than 180° about the shank to insure that the wedge will be retained on the shank.

The wedge member 24 is further characterized by having arm members 30 extending from the longitudinal edges 28 which are adapted to at least partially wrap around the shank and snap into the second recess 18. The wedge member 24 and arms 30 may be given springlike characteristics by employing conventional hardening techniques. The arms 30 include a portion 32 of reduced cross-sectional area which allows these arms to be frangibly connected to the wedge body. The purpose of this frangible connection will be apparent from the description which will follow.

The wedge member 24 is preassembled with the shank 12 by snapping the arms 30 within the complementary recess 18. It should be noted that the axial extent of the recess 18 generally corresponds to the width of the arms 30. The edge of the arms will thus abut shoulders 22 on the recess 18 to preclude free movement of the wedge upwardly in the recess 16. It should also be noted that the uppermost portion of the wedge member is spaced axially from the undercut shoulder 20 to allow the wedge member to move upwardly in the recess as the bolt assembly 10 is inserted in an associated hole with the required force.

In operation, the bolt assembly is associated with a predrilled hole 34 in a workpiece such as concrete 36, as shown in FIG. 5. A complementary rotary threaded member such as nut 38 is provided to impart axial movement to the bolt relative to the hole 34. The anchoring system may be utilized with a washer 40 or may be used to attach a workpiece to the concrete between the concrete and nut member. The expansion end of the bolt is inserted in this hole. In the preassembled form shown in FIG. 1, the radial dimension of the expansion end of the anchor is such that an interference fit is provided in the hole. As the assembly is driven into the hole the wedge 24 is forced to move upwardly relative to the shank to such an extent that the frangible arms 24 react against shoulders 22 and detach themselves from the longitudinal edges of the wedge member. Thus, as the anchor is driven into the hole, the wedge is allowed to move relative to the shank until it abuts undercut shoulder 20 in the recess 16. In the position shown in FIG. 5, the bolt is now prepared to securely anchor itself within the hole 34.

As the bolt is subjected to forces tending to withdraw it from the hole, it may move upwardly while the arcuate surface of the wedge member engages the wall of the hole and tends to stay in the position shown in FIG. 5. As the shank moves upwardly, the diameter of the expansion section increases due to the wedging interaction of the inclined surface 16 and the longitudinal edges 28 of the wedge member. The angular relationship of the edges and the inclined surface to the longitudinal axis of the shank is such that the outer surface of the wedge and the outer surface of the periphery of the shank 12 remain in parallel configuration. The relatively small axial extent of the recess 18 allows a maximization of the surface contact area between the expansion section of the bolt and the walls of the hole 34. Maximization of surface contact between the expansion portion and the walls of the hole is also insured by the generally arcuate outer surface of the wedge. This large surface contact between the walls and the bolt in conjunction with the wedging action provides an evenly applied high resistance to withdrawal of the bolt from the hole.

The interference fit for the bolt assembly within an associated hole is enhanced by the provision of a small upset portion 26, which, as shown in the preferred embodiments, is located at the uppermost portion of the wedge member 24. This portion 26 provides an increased radial outward dimension to the wedge and allows the wedge to bite into the associated wall of a hole and provide firm locking engagement with the wall. This upset or interference protrusion will allow the assembly 10 to be utilized in holes which may have a diameter slightly deviant from the nominal diameter.

Referring to FIG. 6, a modified structure 10a may be used to efficiently preassemble a wedge to a shank. The annular recess 18a is shown as a portion of reduced diameter of shank 12a located at the extremity of the expansion portion of the bolt. The wedge member will include frangible arms 30a located at the lowermost extremity of the wedge 24a. In a manner similar to that shown in FIGS. 1–5, the wedge 24a may be snapped onto this reduced diameter portion 18a as a preassembled unit for shipping and storage. The wedge 24a is precluded from readily being disassociated with the shank by virtue of the spring-like wrap around arms 30a. The wedge will not readily fall off the shank because of the tendency of the wedge to be moved outwardly as it moves down. This outward and downward movement is restrained by the spring arms 30a.

A further embodiment of the invention is shown in FIG. 7. The recess 18b may be of a limited circumferential extent which is just large enough to accept and retain the frangible arms 30b, but does not extend completely around the shank. Thus, the portion of the shank opposite the inclined recess 16b will be continuous and will provide a maximum amount of surface area which may frictionally contact the walls of the hole as the shank is wedged against the hole.

From the foregoing description, an anchor bolt of simple and durable construction is provided which may be constructed of two parts and which is readily preassembled for shipping and storage. The provision of a wedge member with a complementary inclined bearing surface in a shank in a manner which insures a maximum surface contact area between the expansion portion of the bolt and the walls of the associated hole greatly increase the resistance to pull out of such an anchor bolt. The provision of frangible spring-like snap arms to the wedge member facilitates handling.

It may be recognized by those skilled in the art, upon becoming familiar with the principles of this invention, that the illustrated embodiments may be modified in a number of ways without departing from the spirit of the invention. Thus, while the invention has been described in connection with preferred embodiments, it will be understood that it is not intended to limit the invention to these embodiments. On the contrary, it is intended to cover all alternatives, modifications and equivalents that may be included within the spirit and scope of the invention as defined by the appended claims.

I claim:

1. An anchor bolt having a shank including a longitudinally disposed recess including a substantially flat surface inclined inwardly from and adjacent one end thereof, the recess also including an undercut shoulder surface at the upper extremity thereof, a single wedge member fabricated of a spring-like material and including a radially extending barb to provide firm locking engagement with the wall of the associated hole mounted on the shank and associated with the longitudinal recess and including generally longitudinally disposed side edges adapted for sliding engagement with the longitudinal recess, a second recess on the shank located in a plane extending at right angles to the axis of the shank and intersecting with the longitudinal recess, the second recess includes shoulder surfaces extending generally perpendicular to the axis of the shank, the wedge member including arm portions of a given width extending from the side edges of said wedge for preassembled association with the second recess, the wedge being mounted in the longitudinal recess by the association of the arms in the second recess, the axial extent of the second recess being essentially equal to the width of the arms so that the arms can be received for positive retention therein, the arms including notched portions adjacent the side edges of the wedge thus providing a weakened frangible portion of a reduced cross-sectional area in the arms to facilitate the disassociation of the wedge from the second recess and the arms when the anchor is inserted in an associated hole and when the arms abut the shoulder surfaces of the second recess, the upper extremity of the wedge being spaced axially downwardly from the under cut shoulder when in the preassembled condition, the second recess being spaced axially downwardly from the shoulder a distance greater than the axial distance of the juncture of the arms from the upper extremity of the wedge thus allowing the wedge to move longitudinally relative to the shank to produce anchoring engagement with the hole.

2. An anchor bolt in accordance with claim 1 wherein the second recess means has a dimension about the circumference of the shank which generally corresponds to the length of the frangible arms to increase the surface contact between the bolt and walls of an associated hole.

3. An anchor bolt in accordance with claim 1 wherein the second recess is a portion of reduced diameter of the shank at one extremity of the shank.

4. An anchor bolt in accordance with claim 1, wherein the arms of the wedge are snapped in the second recess and the arm and wedge extend greater than 180° around the shank to retain the shank and wedge in a preassembled condition prior to the use of the anchor bolt.

* * * * *